Figure 1:
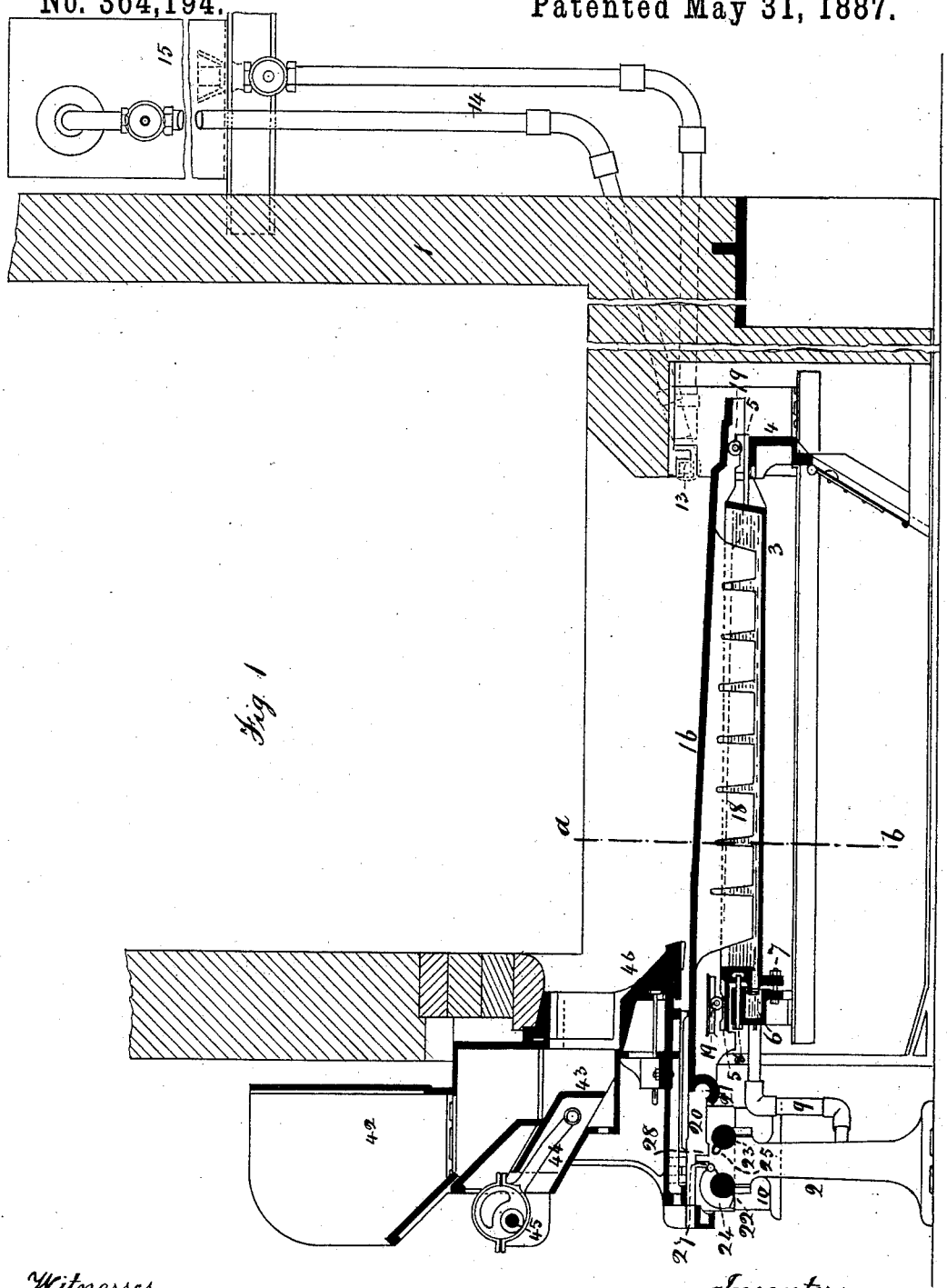

(No Model.) 4 Sheets—Sheet 1.

T. VICARS, THE ELDER, J. VICARS, THE ELDER,
T. VICARS, THE YOUNGER, & J. VICARS, THE YOUNGER.
APPARATUS FOR FEEDING FUEL.

No. 364,194. Patented May 31, 1887.

Witnesses
G. A. Hauberschmidt
Rich'd B. Avery

Inventors
Thomas Vicars the Elder
John Vicars the Elder
Thomas Vicars the Younger
John Vicars the Younger
by F. W. Ritter Jr Atty (No Model.) 4 Sheets—Sheet 2.
T. VICARS, THE ELDER, J. VICARS, THE ELDER, T. VICARS, THE YOUNGER, & J. VICARS, THE YOUNGER.
APPARATUS FOR FEEDING FUEL.
No. 364,194. Patented May 31, 1887.
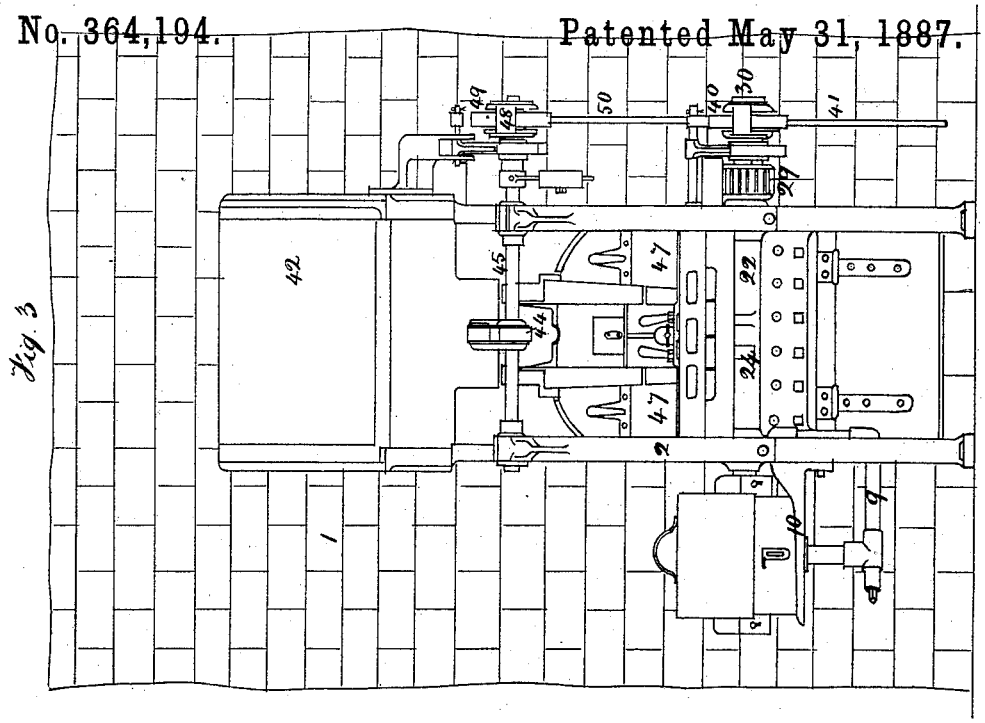
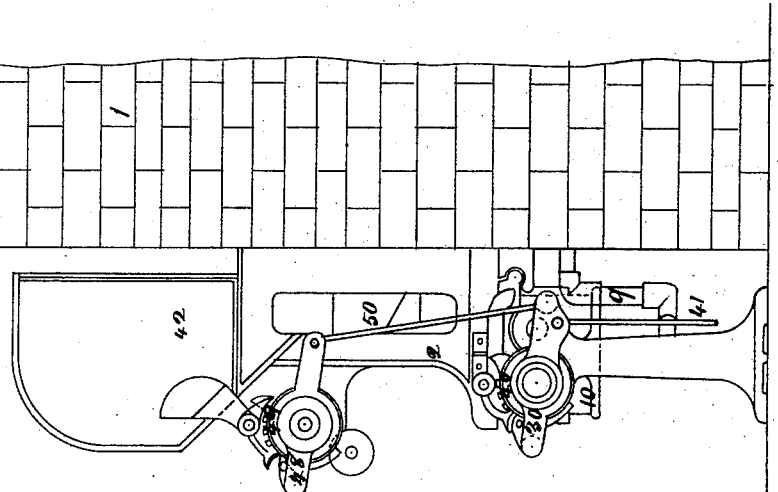
Witnesses
Inventors
Thomas Vicars the Elder
John Vicars the Elder
Thomas Vicars the Younger
John Vicars the Younger
by F. W. Ritter Jr. atty

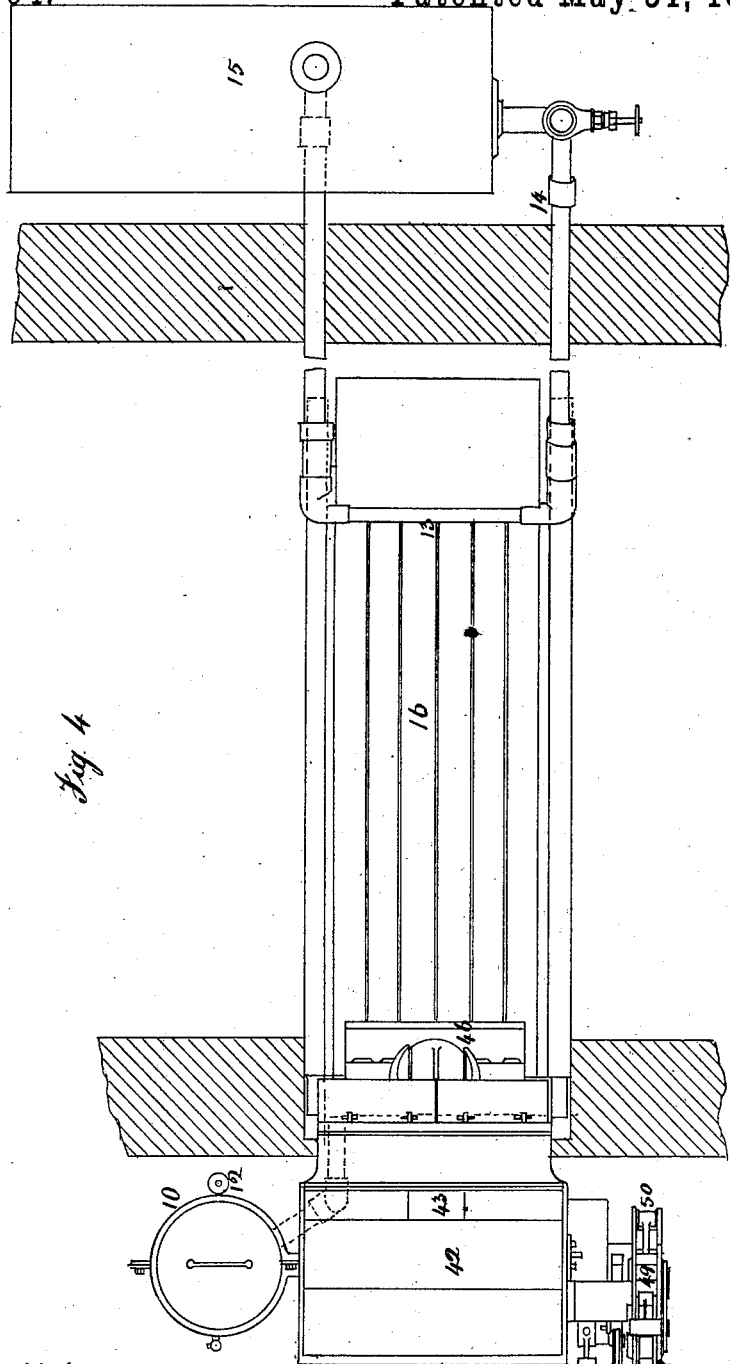

(No Model.) 4 Sheets—Sheet 4.
T. VICARS, THE ELDER, J. VICARS, THE ELDER, T. VICARS, THE YOUNGER, & J. VICARS, THE YOUNGER.
APPARATUS FOR FEEDING FUEL.
No. 364,194. Patented May 31, 1887.
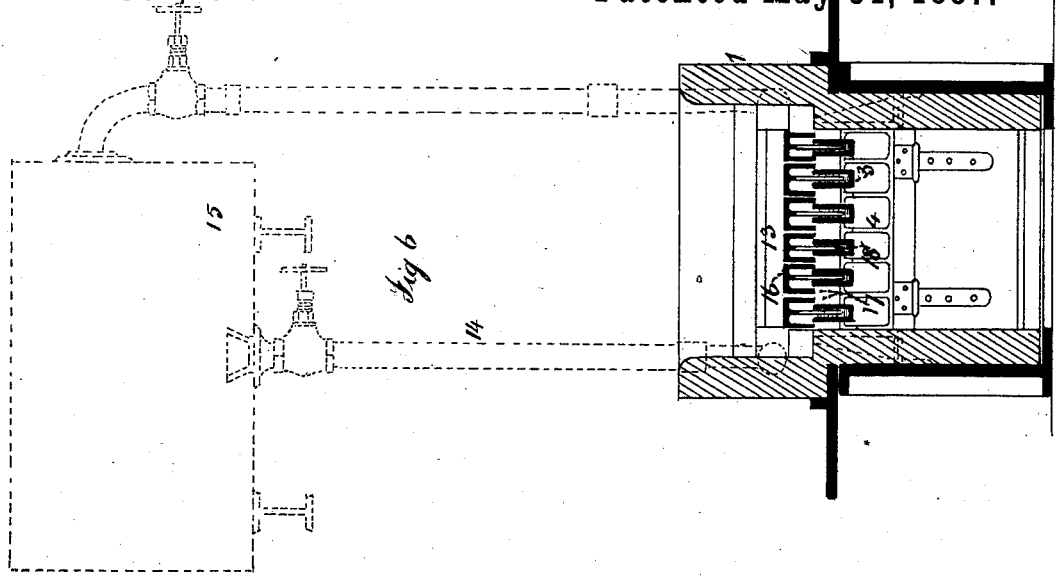
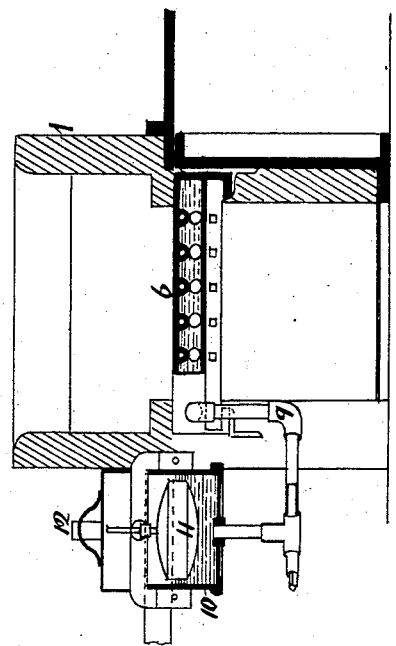
Witnesses.
J. A. Lauberschmidt
Richd B. Avery
Inventors.
Thomas Vicars the Elder
John Vicars the Elder
Thomas Vicars the Younger
John Vicars the Younger
by F. W. Ritter Jr atty

UNITED STATES PATENT OFFICE.

THOMAS VICARS, THE ELDER, JOHN VICARS, THE ELDER, THOMAS VICARS, THE YOUNGER, AND JOHN VICARS, THE YOUNGER, OF LIVERPOOL, COUNTY OF LANCASTER, ENGLAND; FREDERICK W. RITTER, JR., ADMINISTRATOR OF THOMAS VICARS, THE ELDER, DECEASED.

APPARATUS FOR FEEDING FUEL.

SPECIFICATION forming part of Letters Patent No. 364,194, dated May 31, 1887.

Application filed April 6, 1885. Serial No. 161,376. (No model.)

*To all whom it may concern:*

Be it known that we, THOMAS VICARS, the elder, JOHN VICARS, the elder, THOMAS VICARS, the younger, and JOHN VICARS, the younger, the above-named petitioners, subjects of the Queen of Great Britain, residing at Liverpool, in the county of Lancaster, England, have invented a new and useful Improvement in Apparatus for Feeding Fuel to and through Furnaces, of which the following is a specification.

The invention relates to apparatus in which the fuel—namely, crushed or small coal—is fed by means of reciprocating plungers to fire-bars, and in which a united or conjoined forward motion is given to the said fire-bars from the front to the back of the furnace and a serial return motion from the back to the front, so as to cause the fuel to travel gradually through the said furnace.

The main objects are to provide apparatus which shall be applicable to furnaces generally, act efficiently, be simple in construction, and durable, more especially as regards the fire-bars and bridge.

Figure 1 is a longitudinal vertical section, Fig. 2 a side elevation, Fig. 3 a front elevation, Fig. 4 a plan, Fig. 5 a transverse section showing water-connections at front of furnace, and Fig. 6 a transverse section at the line *a b*, all of a furnace under our invention, suitable for supplying heat to a charcoal-kiln, steam-generator, evaporating-pan, or the like.

1 represents brickwork-setting; 2, general frame-work; 3, series of troughs carried at one end on the bearer 4 by means of extensions 5, coupled at the other end by nipples to a transverse trough, 6, and having above the trough extensions 5, similar to those above mentioned; 7, packing; 8, connecting-bolts; 9, pipe leading from trough 6 to cistern 10; 11, float-valve on water-supply pipe 12 to regulate height of water in the cistern 10 and troughs; 13, hollow bridge above the bearer 4; 14, circulation-pipes leading from 13 to the cistern 15.

The above construction prevents the burning fuel from destroying the bridge, and allows of the furnace being advantageously used for any purpose.

16 represents fire-bars made with two outside webs, 17, overhanging the troughs 3, so as to prevent ashes and dirt from entering the said troughs, and with central webs, 18, which dip into the water in the said troughs and prevent the said fire-bars from becoming injuriously heated. The said webs 18 are crenulated, so as to allow for expansion and contraction, and prevent the bars from being broken by variations of temperature. The said bars are fitted at each end with anti-friction rollers 19, which rest on the extensions 5 of the troughs 3.

20 represents slide-bars, coupled to the bars 16 by knuckle-joints 21; 22 23, shafts with cams 24 25, which act on projections 27 28 on the slide-bars 20, so as to move the bars 16 to and fro. The said shafts 22 23 are geared together by toothed wheels 29.

30 represents ratchet-lever and pawl for giving motion to the shaft 22 through the ratchet-wheel 40, secured thereto; 41, rod connecting the ratchet-lever 30 to the actuating mechanism, which may be of any convenient description; 42, coal-hopper; 43, feed-plunger, connected by the eccentric and rod 44 to the shaft 45; 46, dead-plate; 47, furnace-doors; 48, ratchet-lever and pawl for giving motion through the ratchet-wheel 49 to the shaft 45.

The ratchet-lever 48 is connected to the ratchet-lever 30 by the connecting-rod 50.

The action of the apparatus is as follows: The plunger 43 is moved to and fro by the eccentric and ratchet-gear, so as to gradually push small quantities of coal from the hopper 42 onto the dead-plate 46, down which it slides onto the bars 16. The bars 16 are moved forward together by the rotation of the shaft 22 and cam 24 and carry the fuel bodily along the furnace. The said bars are moved back in series by the shaft 23 and cam 25 until they are all moved back. They are then moved forward together by the shaft 22 and cam 24, as before mentioned, and the action is repeated.

It will be obvious that the width of the furnace may vary, and that two or more plungers might be used.

We do not herein broadly claim a bar provided with a dip-web having vertical openings or slots to prevent warping and maintain the metal of the bar at a constant temperature, so as to insure uniformity in the air-supply, as we are aware that the same has been used in conjunction with a water-box or trough common to all the bars (or plate) of a series, and is adapted to forced-blast furnaces, whereas our construction and combinations are more especially adapted to furnaces used with the natural draft.

We claim—

1. In a furnace for utilizing fine fuel, the combination of a bearer, a hollow bridge which overhangs the bearer and is provided with a reservoir and circulation-pipes, a series of bar-troughs whose rear ends rest on the bearer in juxtaposition to the hollow bridge, a transverse supply-trough connected with and delivering into the front ends of the bar-troughs, a supply-cistern provided with a valved float and connected with the transverse supply-trough, and a series of grate-bars having a central and overhanging webs, substantially as and for the purposes specified.

2. In a furnace for utilizing fine fuel, the combination of a series of bar-troughs, a transverse supply-trough connected with and delivering into the front ends of the bar-troughs, a series of webbed reciprocating bars whose forward ends rest on extensions of the bar-troughs, overhanging dead-plate 46, and the hopper and feed-plungers for feeding fine fuel, substantially as shown and described.

3. In a furnace for utilizing fine fuel, the combination, with a series of longitudinal bar-troughs, 3, having extensions 5, of a transverse supply-trough, 6, and a series of grate-bars having crenulated central webs, 18, and overhanging outside webs, 17, substantially as and for the purposes specified.

THOMAS VICARS, THE ELDER.
JOHN VICARS, THE ELDER.
THOMAS VICARS, THE YR.
JOHN VICARS, THE YR.

Witnesses:
H. W. COLLINS,
J. JOHNSON.